(12) United States Patent
Swierkocki et al.

(10) Patent No.: US 7,434,600 B1
(45) Date of Patent: Oct. 14, 2008

(54) PRESSURIZED ACTUATOR SYSTEM FOR INFLATABLE STRUCTURES

(75) Inventors: Thomas W. Swierkocki, Manasquan, NJ (US); Brian Henry, Brick, NJ (US)

(73) Assignee: Air Cruisers Company, Wall, NJ (US)

( * ) Notice: Subject to any disclaimer, the term of this patent is extended or adjusted under 35 U.S.C. 154(b) by 564 days.

(21) Appl. No.: 11/002,859

(22) Filed: Dec. 2, 2004

(51) Int. Cl.
*B65B 1/08* (2006.01)
*B60R 21/26* (2006.01)

(52) U.S. Cl. ............... 141/67; 141/46; 141/54; 141/99; 280/736

(58) Field of Classification Search ........ 141/4, 141/9, 10, 19, 25, 46, 54, 67, 99, 114, 237; 441/81; 244/137.1, 905; 280/736
See application file for complete search history.

(56) References Cited

U.S. PATENT DOCUMENTS

| | | | |
|---|---|---|---|
| 3,203,352 A | 8/1965 | Schafranek | |
| 3,463,287 A | 8/1969 | Smith | |
| 3,621,383 A | 11/1971 | Rush | |
| 3,815,849 A | 6/1974 | Meston | |
| 3,840,057 A | 10/1974 | Lesh | |
| 3,910,532 A | 10/1975 | Fischer | |
| 4,104,964 A | 8/1978 | Larkworthy et al. | |
| 4,375,877 A | 3/1983 | Shorey | |
| 4,457,730 A | 7/1984 | Foster et al. | |
| 4,460,343 A | 7/1984 | Heimovics, Jr. et al. | |
| 4,512,539 A | 4/1985 | Ackermann et al. | |
| 4,566,862 A | 1/1986 | Halavais | |
| 4,567,977 A * | 2/1986 | Fisher | 193/25 B |
| 4,577,817 A | 3/1986 | Hernandez | |
| 4,666,413 A | 5/1987 | Klein et al. | |
| 5,150,767 A | 9/1992 | Miller | |
| 5,161,754 A | 11/1992 | Duggal | |
| 5,284,453 A | 2/1994 | Kun | |
| 5,586,615 A | 12/1996 | Hammer et al. | |
| 5,806,572 A | 9/1998 | Voller | |
| 5,871,180 A | 2/1999 | Hublikar | |
| 5,875,868 A | 3/1999 | Smialowicz et al. | |
| 5,975,467 A | 11/1999 | O'Donnell et al. | |
| 5,988,438 A | 11/1999 | Lewis et al. | |
| 6,298,970 B1 | 10/2001 | Targiroff et al. | |
| 6,644,596 B1 | 11/2003 | Juralina et al. | |
| 6,709,305 B2 | 3/2004 | Parrott et al. | |
| 7,128,629 B2 * | 10/2006 | Summers | 441/81 |

* cited by examiner

*Primary Examiner*—Timothy L Maust
(74) *Attorney, Agent, or Firm*—Lawrence G. Fridman

(57) ABSTRACT

A pressurized actuator system for simultaneously deploying a plurality of inflatable floatation devices or other structures for a rotorcraft or other mobile or stationary devices includes a plurality of primary sources of pressurized fluid adapted for deploying a corresponding number of inflatable structures, a plurality of primary valves that are each operatively associated with one of the primary sources, a plurality of pressure-responsive primary transducers operative to open a different one of the primary valves, and a secondary source of pressurized fluid adapted for simultaneously operating the primary transducers to thereby open the primary valves and simultaneously deploy the plurality of inflatable structures.

17 Claims, 6 Drawing Sheets

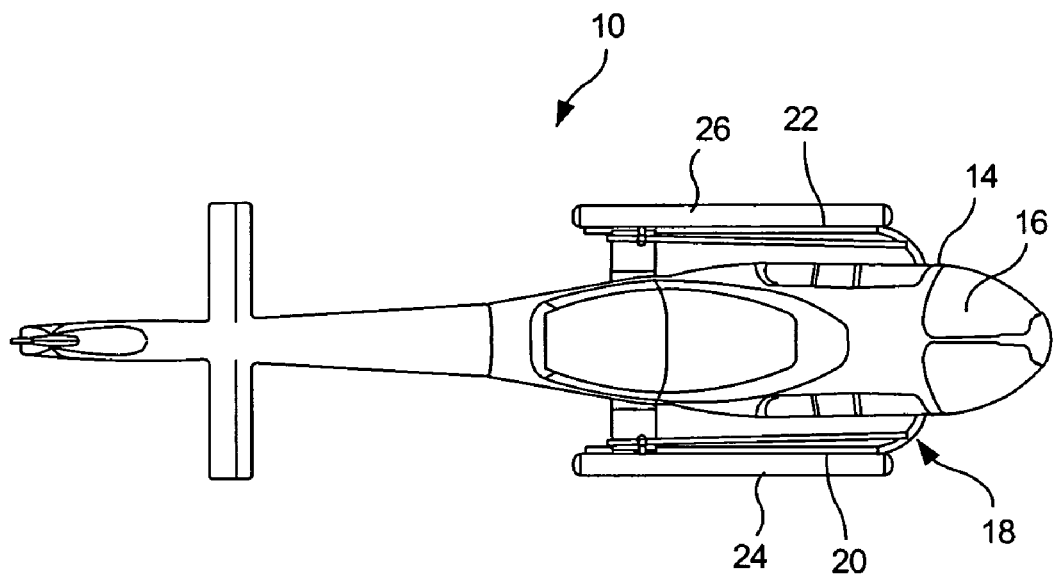
F I G. 1
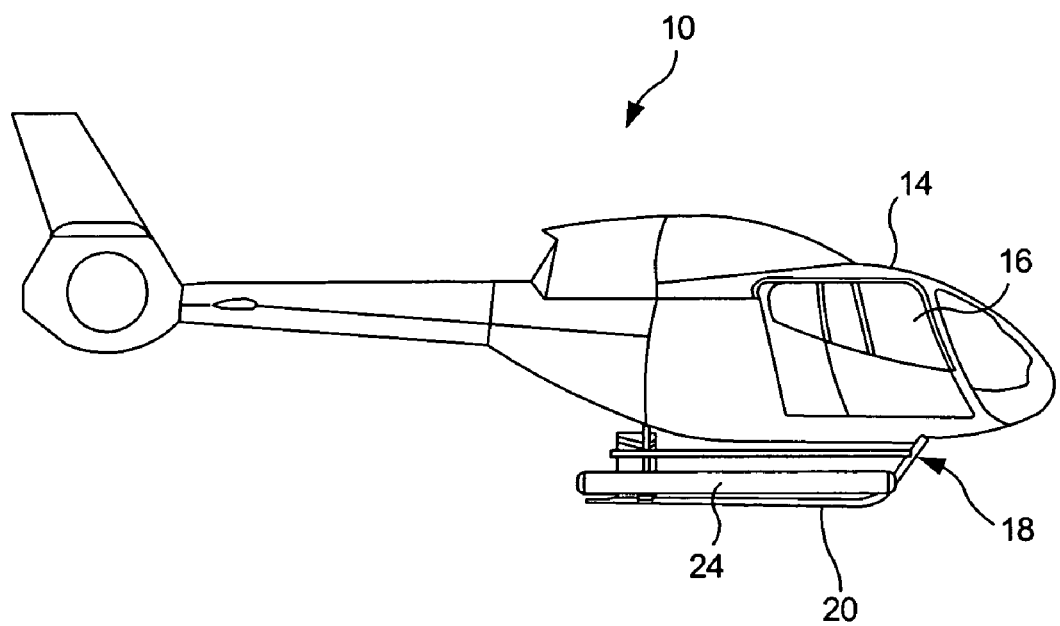
F I G. 2

PRESSURIZED ACTUATOR SYSTEM FOR INFLATABLE STRUCTURES

BACKGROUND OF THE INVENTION

This invention relates to the deployment of inflatable structures, and more particularly to a pressurized actuator system that utilizes pneumatic or hydraulic force for initiating the reliable rapid deployment of inflatable structures and/or the simultaneous deployment of multiple inflatable structures.

Certain types of aircraft, such as commercial fixed wing aircraft and rotorcraft such as for example, helicopters, are required by the regulatory agencies to carry inflatable floatation devices for passenger safety in the event of an emergency situation over water. Fixed wing commercial aircraft, for example, typically include one or more inflatable slides that are normally stored uninflated in a container mounted on the interior of the aircraft door or immediately adjacent thereto. With the door closed, a girt bar is connected to brackets on the floor inside the doorway such that it is only necessary to open the door to automatically deploy the slide in the event of an emergency evacuation. When the door is opened, the girt bar normally pulls the slide through the doorway until gravity can take effect to unfold or unroll the slide outside of the doorway. Once outside the doorway, the slide or slide/raft is rapidly inflated through the application of fluid pressure.

In military applications, inflatable life rafts and their inflation systems are sometimes located in external compartments of the aircraft in order to maximize space in the fuselage for transporting equipment, supplies and personnel. Multiple life rafts and their inflation systems may be located in the external compartments. The inflation system for each life raft includes a container of pressurized gas with an inflation valve that can be actuated from a remote location, such as the cockpit, by mechanical means which may be in the form of a cable and pulley system routed through the aircraft. When a pull handle or similar device associated with the system is activated, the valve is opened and the pressurized gas is discharged from the container and into the life raft causing its rapid inflation. Some of such inflation systems employ a secondary applied force for discharging a secondary pressurized fluid to indirectly activate the primary inflating system. An example of such systems has been disclosed in U.S. Pat. No. 6,644,596. It should be noted however that such prior art deployment systems are typically adapted for deployment of a single inflatable structure and not necessarily concentrated simultaneous deployment of multiple inflatable structures.

Mechanical inflation systems for rotorcrafts have also been employed in order to enable the rotorcraft to land on water in an emergency situation, such as when the rotorcraft loses power. Such systems provide passengers with extra crucial time to escape before the rotorcraft sinks. The inflation system typically includes multiple emergency flotation devices mounted to the rotorcraft landing gear, a container of pressurized gas for each floatation device, an inflation valve associated with the pressurized container, and a mechanical system routed through the helicopter for actuating the inflation valves. It is essential that all floatation devices are simultaneously deployed to ensure rotorcraft stability, especially as it lands on the water. Unbalanced deployment of the floatation devices could cause the rotorcraft to capsize and prevent the quick escape of passengers. In addition, when an emergency situation occurs at relatively high speeds, such as 120 knots, simultaneous deployment of the floatation devices ensures that the flying characteristics of the rotorcraft will not be unbalanced. Thus, great care must be taken to ensure that the cables are properly sized, sufficiently taut, lubricated, and in good working order so that the floatation devices may be simultaneously deployed.

However, during aircraft maintenance procedures, the cables and pulleys may be painted over and not properly tested and lubricated for movement on a regular basis. Corrosion and debris can also restrict or resist cable movement. Consequently, higher and unequal pull forces may be required to activate the inflation systems. The unequal pull forces may cause only one float to be deployed or cause a highly undesirable delay between the deployments of both floatation devices.

Although other systems or mechanisms can be used for simultaneously deploying the floatation devices, they have their own disadvantages. By way of example, an electrical system might employ a solenoid valve that is actuated upon supplying a voltage. Likewise, a pyrotechnic mechanism uses an explosive charge inside the valve for its activation. However, when an emergency landing situation occurs due to a loss of rotorcraft power, the emergency flotation devices may not be deployed since there may not be enough electrical current to actuate the solenoid valve or set off the explosive charge.

It would therefore be desirous to provide an actuator system that eliminates the requirement for cable and pulley systems as well as electrically powered mechanisms. It would be further desirous to provide an actuator system that ensures the simultaneous deployment of multiple flotation devices.

BRIEF SUMMARY OF THE INVENTION

One aspect of the present invention provides a pressurized actuator system for deploying at least one inflatable structure. The system includes a primary source of pressurized fluid adapted for deploying an inflatable structure, a primary valve operatively associated with the primary container, a pressure-responsive primary transducer operative to open the primary valve, and a secondary source of pressurized fluid adapted for operating the primary transducer to thereby open the primary valve and deploy the at least one inflatable structure.

Another aspect of the present invention provides a pressurized actuator system for simultaneously deploying a plurality of inflatable structures. The system includes a plurality of primary sources of pressurized fluid adapted for deploying a plurality of inflatable structures, a plurality of primary valves that are operatively associated with different primary sources of pressurized fluid, a plurality of pressure-responsive primary transducers operative to open their respective primary valves, and a secondary source of pressurized fluid adapted for simultaneously operating the primary transducers to thereby open the primary valves and simultaneously deploy the plurality of inflatable structures.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIG. 1 is a top plan view of a rotorcraft employing the pressurized actuator system of the present invention with a pair of floatation devices in an undeployed state;

FIG. 2 is a side elevational view of the rotorcraft of FIG. 1 with the flotation devices in the undeployed state;

FIG. 7 is an enlarged view of a deployment portion of the pressurized actuator system of FIG. 6;

Figure 3:
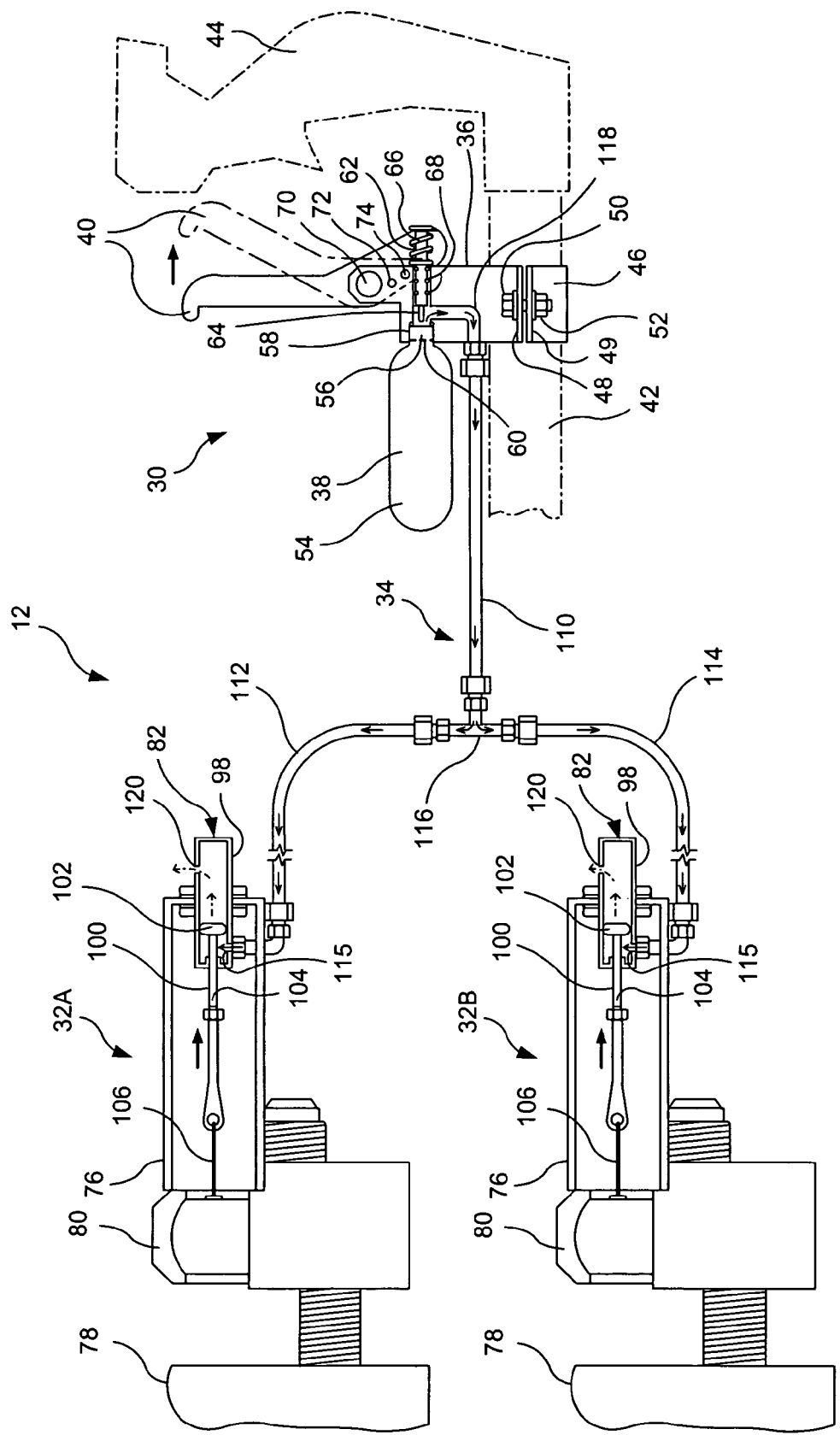
FIG. 3 is a schematic view of the pressurized actuator system in accordance with the present invention.

It is noted that the drawings are intended to depict only typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Referring now to the drawings in general, and to FIGS. 1 and 2 in particular, a rotorcraft or helicopter 10 employing a pressurized actuator system 12 (FIG. 3) in accordance with an exemplary embodiment of the present invention is illustrated. The rotorcraft 10 includes a main body 14 with a cockpit 16, a landing structure 18 having a first landing skid 20 and a second landing skid 22 which extend along a longitudinal axis of the rotorcraft and are in contact with the ground when not in flight. A pair of inflatable floatation devices 24 and 26 are connected to the first and second landing skids 20 and 22, respectively. It will be understood that more or less floatation devices can be provided on each leg and/or other parts of the rotorcraft 10.

With additional reference to FIG. 3, the pressurized actuator system 12 includes an actuator portion 30 and a pair of deployment portions 32A, 32B that are fluidly connected to the actuator portion 30 through a pressure-resistant pipe or tubing system 34. Each deployment portion 32A, 32B is associated with a separate floatation device 24, 26. Accordingly, it will be understood that the actuator system 12 can be formed with more or less deployment portions, depending on the number of installed inflatable flotation devices and/or the number of inflatable flotation devices adapted for simultaneous deployment. The actuator portion 30 is preferably installed in the cockpit 16 of the rotorcraft 10 or other aircraft, while the deployment portions 32A, 32B are preferably installed adjacent to their respective inflatable floatation devices 24, 26.

Figure 4:
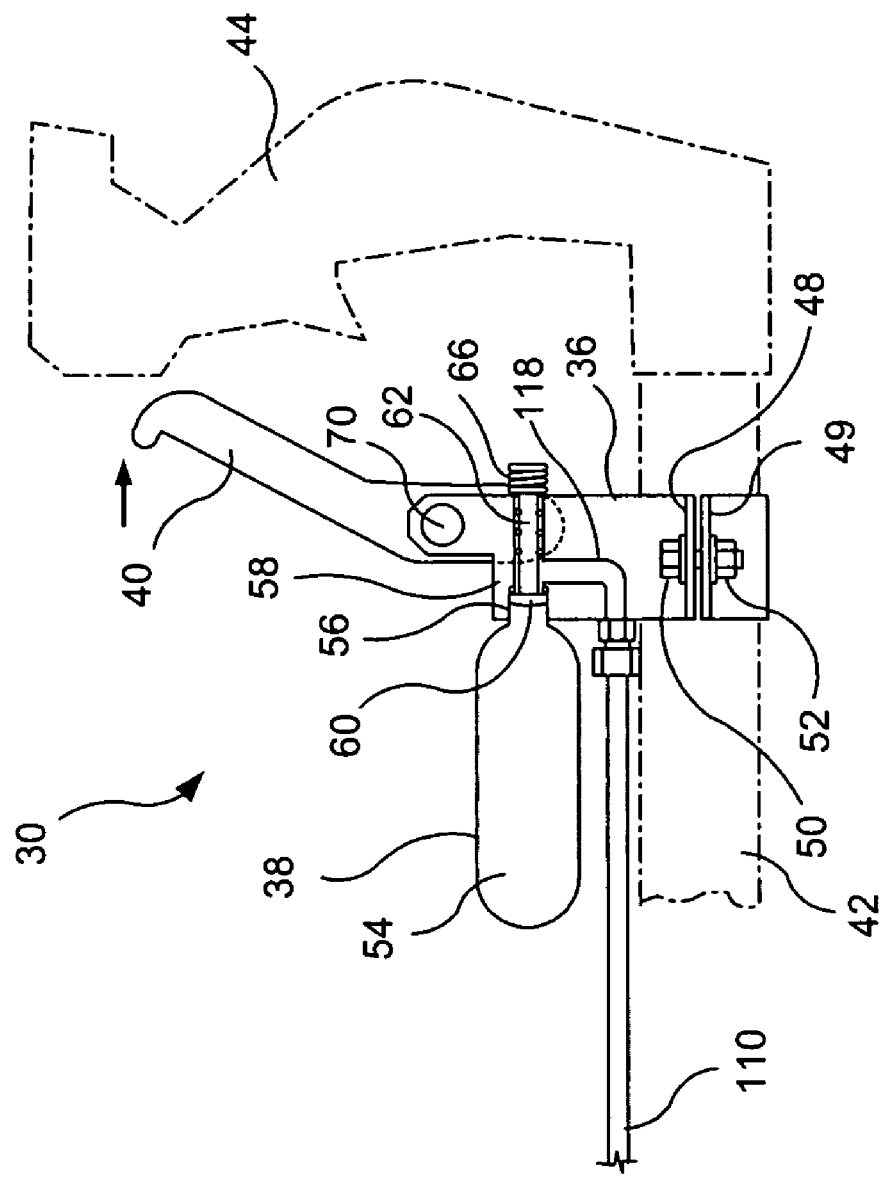
FIG. 4 is a side elevational view of a manual actuator portion of the pressurized actuator system of FIG. 3 in an actuated position.

With additional reference to FIG. 4, the actuator portion 30 preferably includes a base member 36, a secondary pressurized fluid source 38 mounted to the base member, and a secondary actuator in the form of an actuator arm or lever 40 movably or pivotally mounted to the base structure for accessing the pressurized fluid source.

In one embodiment of the invention, the base structure 36 has oppositely extending upper flanges 48 (only one shown) that abut with oppositely extending lower flanges 49 (only one shown) of a lower bracket portion 46 for mounting the base member 36 to a support 42 (shown in phantom line) of a rotorcraft control arm 44 (also shown in phantom line). A threaded fastener or bolt 50 extends through each of the lower and upper flanges and a threaded nut 52 secures the base structure 36 to the lower bracket portion 46 to thereby securely mount the base member onto the support 42. With the base structure 36 mounted near the control arm 44, a user can quickly access the arm 40 for deploying the inflatable floatation devices 24, 26 in the event of an emergency where quick response time may be crucial. The extra leverage provided by the control arm 44 permits a user to squeeze the actuator arm 40, thereby facilitating actuation of the actuator portion 30. It will be understood, however, that the base structure 36 can be mounted at other locations and/or with different mounting means arrangement utilizing any conventional type of fasteners or bracket arrangements, welding, and so on.

The secondary pressurized fluid source 38 preferably comprises a secondary container 54 with a neck portion 56 that is mounted in a bore 58 of the base structure 36 through well-known mounting means (not shown), such as cooperating threads, welding, brackets, and so on. A cap 60 (shown in hidden line) is positioned in the neck portion 56 for sealing the contents of the container 54. Preferably, the container 54 is charged with a compressed fluid, such as $CO_2$, to approximately 900 psi at room temperature, or Nitrogen to approximately 1500 psi. However, it will be understood that virtually any fluid that is capable of storing energy can be used for this purpose, such as regular air, helium, hydraulic fluid, and so on. It will be further understood that the particular pressure in the container 54 can greatly vary depending on the type of fluid used and the forces required to activate one or more of the deployment portions 32A, 32B.

A puncture shaft 62 is mounted for sliding movement in the bore 58 and includes a tip 64 that extends toward the cap 60. The tip 64 is adapted to puncture the cap 60 when the actuator arm 40 is pressed toward the control arm 44, as shown in FIG. 4. A compression spring 66 is mounted between the base structure 36 and the shaft 62 for normally biasing the tip 64 away from the cap 60. A plurality of O-rings 68 are positioned around the shaft within the bore 58 for guiding the movement of the shaft and sealing the bore 58 after the cap 60 has been pierced. It will be understood that more or less O-rings may be provided. It should be also clear that utilization of any other conventional sealing arrangement is within the scope of the invention.

The actuator lever or arm 40 is pivotally connected to the base structure 36 through a pivot pin 70. A removable safety pin 72 locks the actuator arm or lever 40 against movement with respect to the base member 36 to prevent inadvertent actuation of the actuator system 12 while the rotorcraft is grounded. A shear pin or rivet 74 is located in the base member 36 to prevent inadvertent movement of the actuator lever or arm 40 during flight. With this arrangement, the shear pin 74 must be broken before the system can be activated. Preferably, the geometry of the actuator lever and shear pin are arranged so that a force of approximately 15 to 20 pounds applied to the actuator lever is required to shear the pin and move the lever. In this manner, inadvertent deployment of the floatation devices is prevented during rotorcraft operation. It will be understood that the shear pin 74 and/or the actuator lever 40 can be arranged to accommodate greater or lesser applied forces. It will be appreciated that other safety means can be used for preventing inadvertent actuation of the actuator system 12, such as springs, pistons, and so on, connected between the actuator lever 40 and control arm 44 or other structure.

Figure 5:
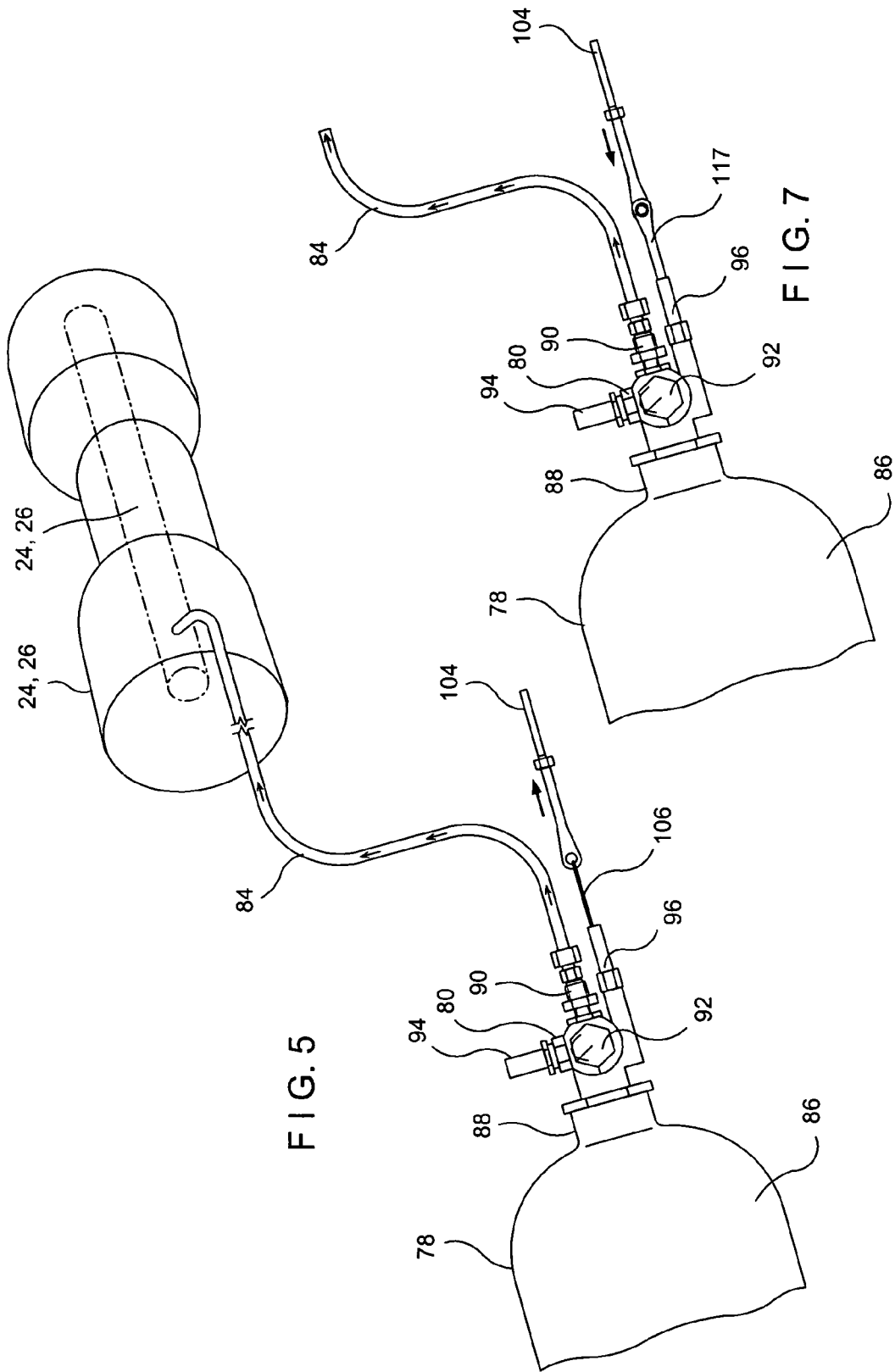
FIG. 5 is an enlarged view of a deployment portion of the pressurized actuator system of FIG. 3.

With reference now to FIGS. 3 and 5, the deployment portions 32A and 32B are preferably identical in construction and each preferably includes a base member 76, a primary pressurized fluid source 78 with a primary valve 80 mounted to the base member 76, a pressure-responsive primary transducer 82 connected to the base member 76 and the primary valve 80, and a deployment conduit 84 fluidly connected to the primary fluid source 78 and one of the floatation devices 24, 26.

As best shown in FIG. 5, the primary pressurized fluid source 78 preferably comprises a primary container 86 with a neck portion 88 that mounts the primary valve 80. The primary valve 80 is of conventional construction and includes a primary nozzle 90 connected to the deployment conduit 84 for discharging fluid under pressure from the primary container 86 to one of the floatation devices 24, 26. A pressure gauge 92 is provided on the primary valve 80 for displaying the fluid pressure inside the primary container 86. The primary valve 80 also includes a fill port 94 for charging the primary container 86 with fluid and a primary valve actuator 96 that can be manipulated for opening the primary valve 80 and discharging the pressurized fluid from the primary container 86 into the floatation device through the primary nozzle 90.

As shown in FIG. 3, the primary transducer 82 is preferably a linear actuator and includes a hollow cylinder 98 mounted to the base member 76 and a piston 100 slidably mounted in the cylinder 98. The piston 100 has a head 102 that is positioned in the cylinder and a shaft, rod or element 104 that extends from the head 102 and out of the cylinder. A link arm 106 is connected between the shaft, rod or element 104 and the primary valve actuator 96 (FIG. 5) for opening the primary valve when the piston 100 moves in the cylinder 98. Preferably, the link arm is in the form of a lanyard, cable or other flexible member.

In one embodiment of the invention, the tubing system 34 includes a first tubing section 110 connected to both a second tubing section 112 and a third tubing section 114 through a T-connector 116. The first tubing section 110 is connected to the base member 36 of the actuator portion 30 and is in fluid communication with a second bore 118 formed in the base member 36, which is in turn in fluid communication with the first bore 58. The second tubing section 112 extends between the T-connector 116 and the cylinder 98 of the primary transducer 82 of the deployment portion 32A. Likewise, the third tubing section 114 extends between the T-connector 116 and the cylinder 98 of the primary transducer 82 of the deployment portion 32B. The tubing system 34 can be constructed of rigid, semi-flexible or flexible material, such as metal, plastic or elastomers or combinations thereof. In accordance with an exemplary embodiment of the invention, the tubing sections 110, 112 and 114 are constructed of a Teflon™ material with a polyester overbraid to protect the tubing from damage. Stainless steel fittings may be used to connect the tubing sections to the rest of the system. It will be understood that the materials for the tubing sections and the fittings can greatly vary and utilization of any conventional material is within the scope of the invention.

Figure 8:
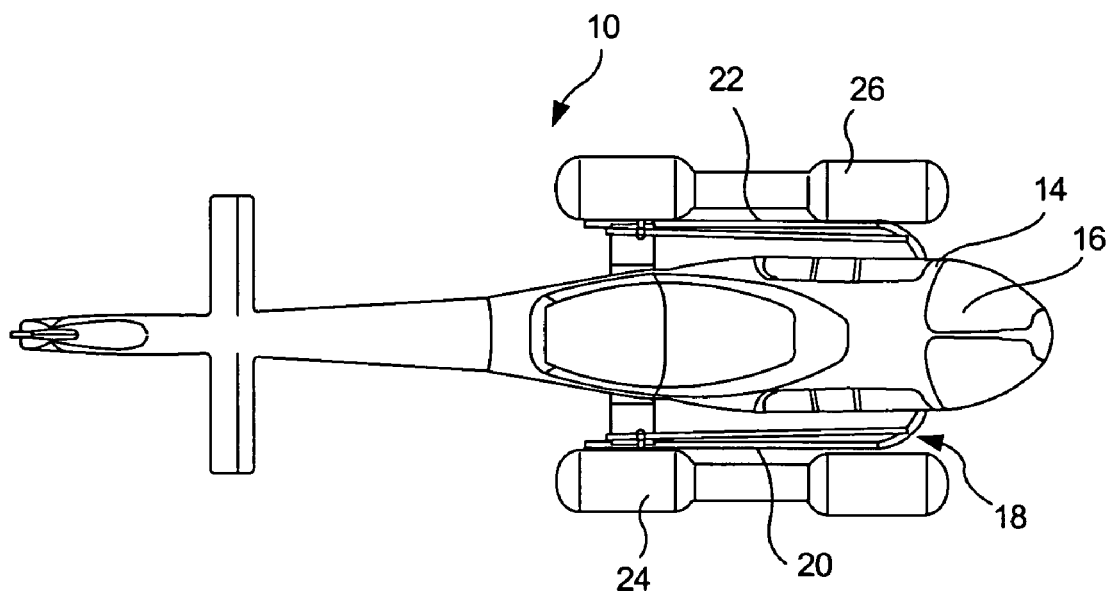
FIG. 8 is a top plan view of the rotorcraft employing the pressurized actuator system of the present invention with the pair of flotation devices in a deployed state.
Figure 9:
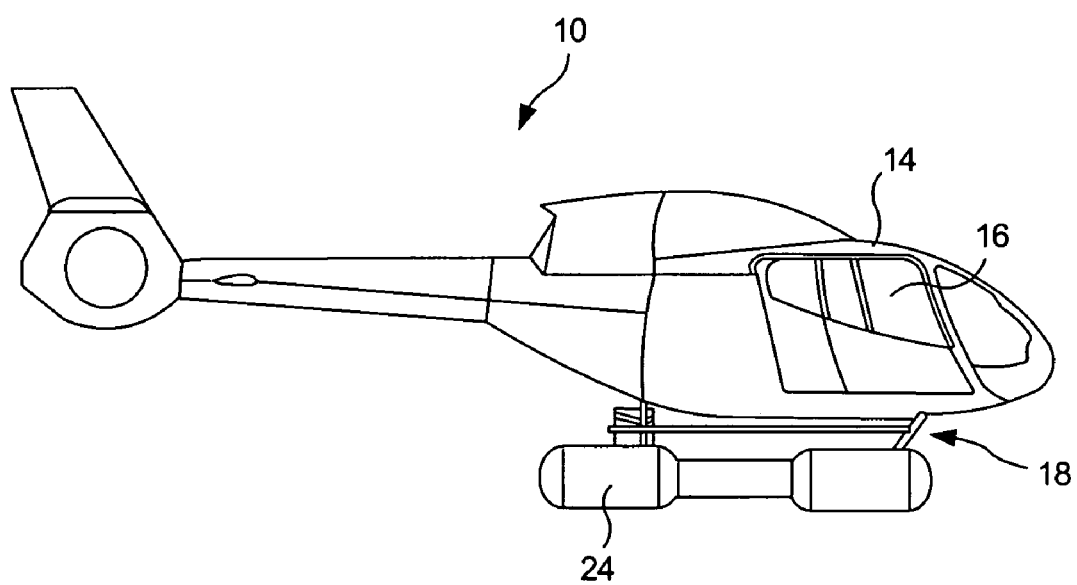
FIG. 9 is a side elevational view of the rotorcraft of FIG. 8 with the pair of flotation devices in the deployed state.

In use, the inflatable floatation devices are initially stored in a compressed undeployed condition, as shown in FIGS. 1 and 2, and in phantom line in FIG. 5. As best illustrated in FIG. 3, in this position, the lever or arm 40 is in the fully forward position and the secondary container 54 is undisturbed. Accordingly, in this initial condition the fluid pressure in the tubing system 34 is minimal and little or no pulling force is exerted on the link arm 106 and on the primary valve actuator 96, as best illustrated in FIG. 5. When the lever arm 40 is pulled toward the control arm 44 with sufficient force to break the shear pin 74 (FIGS. 3 and 4), either manually by a pilot or other person or automatically through well-known mechanisms, the puncture shaft 62 is forced forward until the puncture tip 64 pierces the cap 60 of the secondary container 54. As shown in FIG. 3, when the lever arm is released, the spring 66 will force it back to the forward position and fluid under pressure will be discharged into the first, second and third tubing sections 110, 112 and 114, respectively. With the outlet 115 of each tubing section 112 and 114 positioned forward of the piston head 102, the piston is forced rearwardly into the cylinder to thereby pull the shaft 104 and link arm 106 associated therewith sufficient force to activate the primary valve actuator 96 (FIG. 5). A vent hole 120 is provided in each cylinder 98 rearwardly of the piston head 102 for facilitating piston movement. Eventually, the forward end of the link arm 106 breaks free of the primary valve actuator 96 and the pressurized fluid from the primary container 86 is discharged into its respective inflatable floatation device 24, 26 through the primary nozzle 90 to thereby inflate the inflatable devices, as shown in FIGS. 5, 8 and 9.

Figure 6:
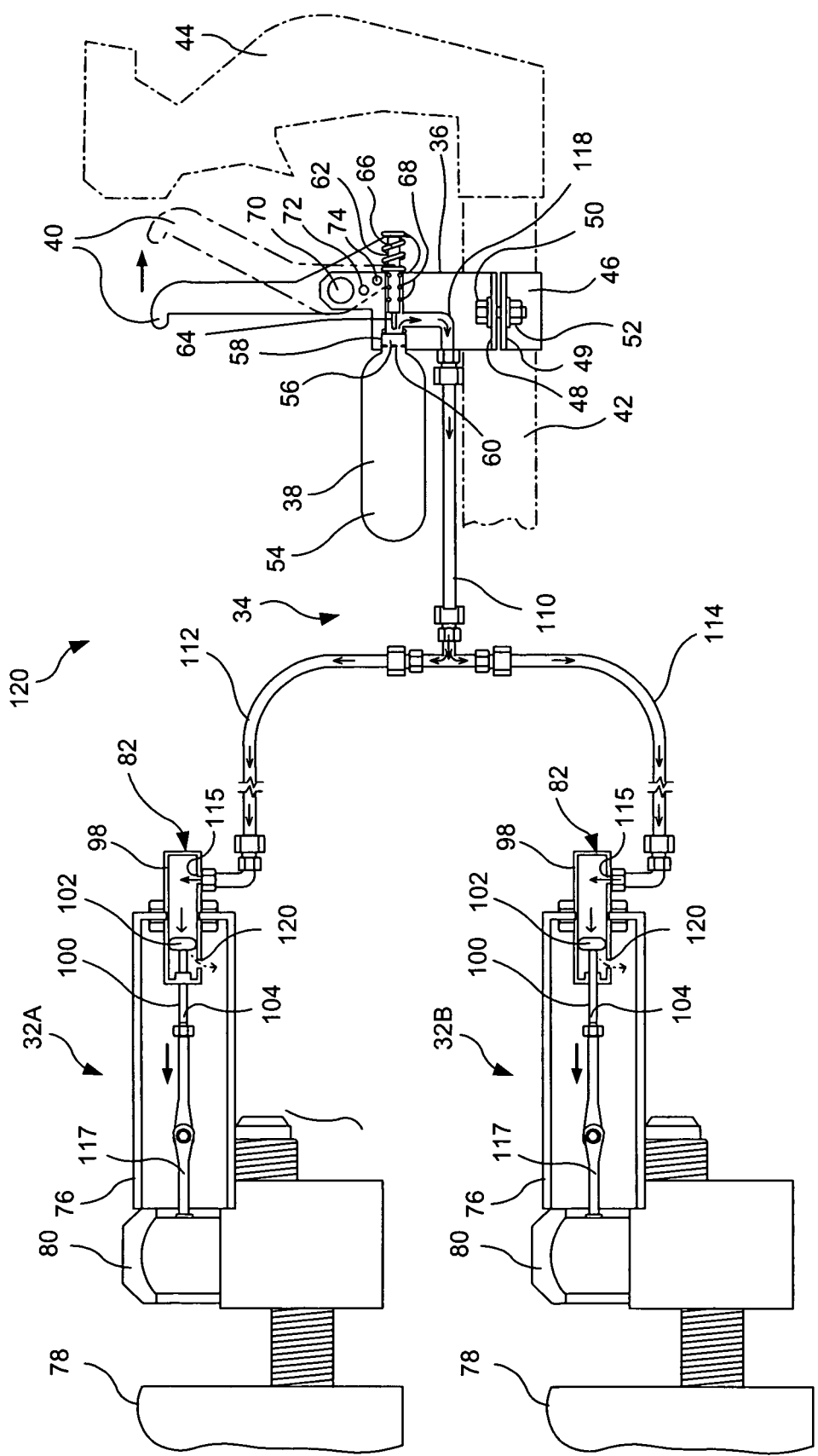
FIG. 6 is a schematic view of a pressurized actuator system in accordance with a further embodiment of the present invention.

The pressure required to simultaneously force the pistons 100 rearwardly and activate the primary valve actuators 96 will depend on the type of primary container and valve used, as well as the size and configuration of the primary transducer 82. By way of example, a force of approximately 20-30 lbs may be required to activate the primary valve actuators 96 of both deployment portions 32A and 32B. For a primary container having a diameter of about 0.75 inch, an applied pressure of about 75 psi should be sufficient. It will be understood that the ranges of pull forces for opening the valves of the primary and secondary cylinders are given by way of example only, and may vary greatly depending on the size of the cylinders, the type of valves used, the size of the structure(s) to be inflated, the presence or absence of a vacuum force, as well as other factors Turning now to FIGS. 6 and 7, a pressurized actuator system 120 in accordance with a further embodiment of the invention is illustrated. The actuator system 120 is similar in construction to the actuator system 12 previously described, with the exception that the flexible link arm 106 is replaced with a solid link arm 117 and the outlet 115 of each tubing section 112 and 114 is positioned on the cylinder 98 rearward of the piston head 102. When the secondary source of pressurized fluid or the secondary container 54 is activated, as previously described, the piston 100 is forced forwardly out of the cylinder to thereby push the link arm 117 with sufficient force to activate the primary valve actuator 96 (FIG. 7). The primary valve actuator 96 may be of the well known type that releases fluid under pressure when punctured or otherwise breached. Thus, a puncturing instrument (not shown) may be associated with the primary valve actuator 96 and responsive to forward movement of the link arm 117. As best illustrated in FIG. 6, the vent hole 120 is provided in each cylinder 98 forwardly of the piston head 102 for facilitating piston movement.

One of the unique advantages of the above-described actuator systems is that two or more inflatable floatation devices can be simultaneously deployed without increasing the actuation force that must be applied to the actuator or arm lever 40. This arrangement allows the tubing system 34 to be mounted anywhere throughout the aircraft. Since the tubing sections 112 and 114 are simultaneously pressurized, a difference in their lengths will not affect the simultaneous deployment of the inflatable floatation devices 32A and 32B.

In addition, only a manual or automatic secondary pull force of approximately 15 to 20 pounds is needed to break the shear pin and move the actuator lever 40 in the direction to puncture the cap 60 of the secondary container 54 to generate the primary pull force needed on the link arms 106 or 117 to actuate the primary valves 80 and inflate the floatation devices 24 and 26. In this manner, pilots or other personnel and/or automatic triggering means can activate the actuator system 12 with minimal effort, resulting in an actuator system that is easier to use and more reliable in operation. Moreover, the actuator systems of the present invention is more beneficial compared to the known solutions since the systems of the invention substantially reduce or eliminate damage to adjacent components as often occurs in the prior art mechanical arrangements.

It will be appreciated by those skilled in the art that changes could be made to the embodiments described above without departing from the broad inventive concept thereof. For example, although the deployment of inflatable floatation devices has been described for use with rotorcraft s, it will be understood that the deployment system of the present invention can be used for other aircraft, as well as other movable or stationary structures. It will be further understood that the inflatable devices adapted for use with pressurized actuator system of the invention can be in the form of emergency evacuation devices such as slides and rafts, as well as swimming pools, temporary shelters, or any other inflatable structures. Furthermore, it should be clear that the actuator system of the invention is applicable for actuation of practically any type of inflatable structures remotely positioned from an operator.

Moreover, although the primary transducer 82 has been shown and described as a linear actuator, it will be understood that other arrangements, such as for example, fluid-powered rotary actuators can be used.

It will be understood, therefore, that this invention is not limited to the particular embodiments disclosed, but is intended to cover modifications within the spirit and scope of the present invention as defined by the appended claims.

What is claimed is:

1. A pressurized actuator system for deploying at least one inflatable structure, the system comprising:
    a primary source of pressurized fluid adapted for deploying an inflatable structure;
    a primary valve operatively associated with the primary source;
    a pressure-responsive primary transducer operative to activate the primary valve; and
    a secondary source of pressurized fluid adapted for operating the primary transducer and primary valve actuator to thereby activate the primary valve, the primary transducer comprises at least a cylinder, a piston head provided for movement in the cylinder and a piston element connected to the piston head for movement therewith, the piston element is adapted to operate the primary valve actuator when the pressurized fluid from the secondary source activates the piston head, so as to and deploy the at least one inflatable structure.

2. A system according to claim 1, wherein the primary transducer is a linear transducer which comprises:
    the piston head positioned for sliding movement in the cylinder; and the piston element is a rod connected to the piston head for sliding movement therewith, the piston rod extending out of the cylinder.

3. A system according to claim 2, wherein the cylinder includes a fluid inlet located forward of the piston head so that pressurized fluid from the secondary source causes the piston rod element to pull the primary valve actuator and open the primary valve.

4. A system according to claim 2, wherein the cylinder includes a fluid inlet located rearward of the piston head so that pressurized fluid from the
    secondary container source causes the piston rod element to push the primary valve actuator and open the primary valve.

5. A system according to claim 2, and further comprising an actuator for releasing the pressurized fluid from the secondary source.

6. A system according to claim 5, further comprising a puncture shaft movable in response to movement of the actuator lever for piercing the secondary source and releasing the pressurized fluid.

7. A system according to claim 1, and further comprising an actuator arm for releasing the pressurized fluid from the secondary source.

8. A system according to claim 7, wherein the actuator is a manually positionable actuator arm, the secondary source of pressurized fluid is a secondary container, the system further comprising a puncture shaft movable in response to movement of the actuator lever for piercing the secondary container and releasing the pressurized fluid to the pressure-responsive primary transducer.

9. A system according to claim 1, and further comprising at least one tubing section fluidly connected to the secondary container and the pressure-responsive primary transducer.

10. A pressurized actuator system for simultaneously deploying a plurality of inflatable structures, the system comprising:
    a plurality of primary sources of pressurized fluid adapted for deploying a plurality of inflatable structures;
    a plurality of primary valves, each primary valve being operatively associated with one of the primary sources;
    a plurality of pressure-responsive primary transducers, each primary transducer being operative to activate one of the primary valves; and
    a secondary source of pressurized fluid adapted for simultaneously operating the primary transducers to thereby activate the primary valves;
    each said primary transducer comprises at least a cylinder, a piston head provided for movement in the cylinder and a piston element connected to the piston head for movement therewith, the piston element is adapted to operate a respective primary valve actuator when pressurized fluid from the secondary source activates the piston bead and simultaneously deploy the plurality of respective inflatable structures.

11. A system according to claim 10, and further comprising a tubing system fluidly connected to the secondary source and the pressure-responsive transducers.

12. A system according to claim 10, wherein each primary transducer comprises a linear transducer for operating its respective primary valve actuator.

13. A system according to claim 12, wherein each linear transducer comprises:
    the piston element is a piston rod connected to the piston head for sliding movement therewith, the piston rod extending out of the cylinder and being adapted to operate its respective primary valve actuator when the pressurized fluid from the secondary source is applied to the piston head to thereby causes sliding movement of the piston head within the cylinder.

14. A system according to claim 13, wherein the cylinder includes a fluid inlet located forward of the piston head so that pressurized fluid from the secondary source causes the piston rod element to pull its respective primary valve actuator and open its respective primary valve.

15. A system according to claim 13, wherein the cylinder includes a fluid inlet located rearward of the piston head so that pressurized fluid from the secondary source causes the piston rod element to push its respective primary valve actuator and open its respective primary valve.

16. A system according to claim 11, wherein the secondary source includes a secondary container and further comprising an actuator for releasing the pressurized fluid from the secondary container.

17. A system according to claim 16, wherein the actuator is a manually positionable actuator arm the system further comprising a puncture shaft movable in response to movement of the actuator lever for piercing the secondary container and releasing the pressurized fluid to each linear transducer through the tubing system.

\* \* \* \* \*